United States Patent [19]

Hasman et al.

[11] Patent Number: 5,075,800
[45] Date of Patent: Dec. 24, 1991

[54] METHOD OF OPTIMIZING HOLOGRAPHIC OPTICAL ELEMENTS

[75] Inventors: Erez Hasman, Givatayim; Asher A. Friesem, Rehovot, both of Israel

[73] Assignee: Yeda Research and Development Co. Ltd., Rehovot, Israel

[21] Appl. No.: 445,054

[22] Filed: Dec. 4, 1989

[51] Int. Cl.$^5$ .......................... G02B 27/44; G02B 5/18
[52] U.S. Cl. .................................... 359/900; 359/558; 359/569
[58] Field of Search .............. 350/320, 162.11–162.24, 350/3.6–3.86

[56] References Cited

U.S. PATENT DOCUMENTS

| | | | |
|---|---|---|---|
| 4,397,527 | 8/1983 | Geyer | 350/162.11 |
| 4,815,820 | 3/1989 | McNeil et al. | 350/320 |
| 4,880,286 | 11/1969 | Ih | 350/3.66 |

OTHER PUBLICATIONS

"Optimized Holographic Optical Elements", Kedmi et al, 1986 Optical Society of America, vol. 3, pp. 2011–2018.

"Computer-originated aspheric holographic optical elements" Fairchild et al, Optical Engineering, vol. 21, No. 1, pp. 133–140.

Primary Examiner—Bruce Y. Arnold
Assistant Examiner—Thong Nguyen
Attorney, Agent, or Firm—Benjamin J. Barish

[57] ABSTRACT

A method of designing a holographic optical element (diffractive grating) that transforms a set of waves into another set of waves in order to minimize aberrations in the phase of the output wavefront, includes the steps: (a) define continuous input parameters that characterize the propagation vector components of the incoming wavefront and the desired output wavefront; (b) formulate integral equations for the optimal grating vector components; and (c) solve the integral equations for the optimal grating vector components to minimize the difference between the actual and desired output wavefronts.

12 Claims, 4 Drawing Sheets

1. The readout geometry for a reflective off-axis Holographic Focussing Element (HFE).

METHOD OF OPTIMIZING HOLOGRAPHIC OPTICAL ELEMENTS

FIELD AND BACKGROUND OF THE INVENTION

The present invention relates to a method for optimizing holographic optical elements, hereinafter referred to as "HOE's".

In an optical system that is designed to operate with monochromatic or quasi-monochromatic illumination sources, it is possible to replace the conventional refractive elements with holographic optical elements (HOE's) that are based on diffractive optics. In general, the HOE's transform a given set of waves into another set of waves.

The increase in use of monochromatic radiation in complicated optical systems that require better optical performance and certain geometrical needs, has resulted in HOE's becoming very attractive. This is particularly true for systems operating in the far infrared (IR) radiation, for example 10.6 microns. In such systems, holographic elements that are based on diffractive optics have several advantages over conventional elements, in that they are thinner, more lightweight, and can perform operations that are impossible by other means.

There are many applications using $CO_2$ lasers, operating at 10.6 microns wavelength, in which the HOE's are particularly useful. These include laser material processing, medical surgery, and infrared laser radars. For such applications, since there are no practical recording materials for far IR, the HOE's must be formed by using indirect recording. In practice, a computer generated mask, representing the grating function, is first plotted with a laser scanner, then reduced in size with optical demagnification, and finally recorded as a relief pattern with photolithographic techniques.

One of the main factors that have hindered the widespread use of diffractive elements for far IR radiation is that HOE's have relatively large amounts of aberrations. This is because the readout geometries and wavelengths are not identical to the recording geometry and wavelength. In order to minimize the aberrations, it is necessary to use optimization procedures for designing and recording a holographic element having a complicated grating function. Several optimization procedures have been proposed.

One known optimization procedure is based on numerical iterative ray-tracing techniques. This procedure, however, requires extensive calculations of ray directions, and the solutions often converge to local minima rather than to the desired absolute minimum.

Another known optimization procedure is based on minimizing the mean-squared difference of the phases of the actual and desired output wavefronts. In this procedure, the phase must be defined up to an additive constant so that the optimization procedure becomes rather complicated. It is therefore usually necessary to resort to approximate solutions.

As a result, such known optimization procedures do not yield an exact solution except in very specific cases.

OBJECT AND SUMMARY OF THE PRESENT INVENTION

An object of the present invention is to provide a new optimization procedure for designing holographic optical elements.

According to the present invention, there is provided a method of designing a holographic diffractive grating that transforms a set of incident waves into a set of output waves in order to produce output waves having minimum aberrations. The method comprises the following steps: (a) define continuous input parameters that characterize the set of incident waves and a set of desired output waves with propagation vector components; (b) formulate integral equations for optimal grating vector components of the holographic diffractive grating to be designed; and (c) solve the integral equations for the optimal grating vector components to minimize the difference between the propagation vector components of a set of waves actually emerging from the holographic diffractive grating and the set of desired output waves.

In the described preferred embodiment, the integral equations are solved analytically.

The input parameters may include the direction cosine of the set of incoming waves, or the location of the input point sources. The incoming wavefront may be from a monochromatic illumination source, such as a source of infrared laser radiation, e.g., a $CO_2$ laser of 10.6 microns. The incoming wavefront may also be from a quasi-monochromatic illumination source.

In the described preferred embodiment, a computer generated mask representing the grating function is first plotted with a laser scanner, then reduced in size with optical demagnification, and finally recorded as a relief pattern using photolithographic techniques.

As will be shown more particularly below, the optimization procedure according to the present invention is based on analytic ray-tracing that minimizes the mean-squared difference of the propagation vector components between the actual and the desired output wavefronts. The mean-squared difference of the vector components is defined in such a way that the functions involved are continuous.

The design and recording techniques are described below with respect to aspheric low f-number, reflective, off-axis, focussing holographic elements for a readout wavelength of 10.6 microns from a $CO_2$ laser. These aspheric elements have diffraction-limited spot sizes also for plane waves arising from relatively large incidence angles.

BRIEF DESCRIPTION OF THE DRAWINGS

The invention is herein described, by way of example only, with reference to the accompanying drawings, wherein.

Figure 1:
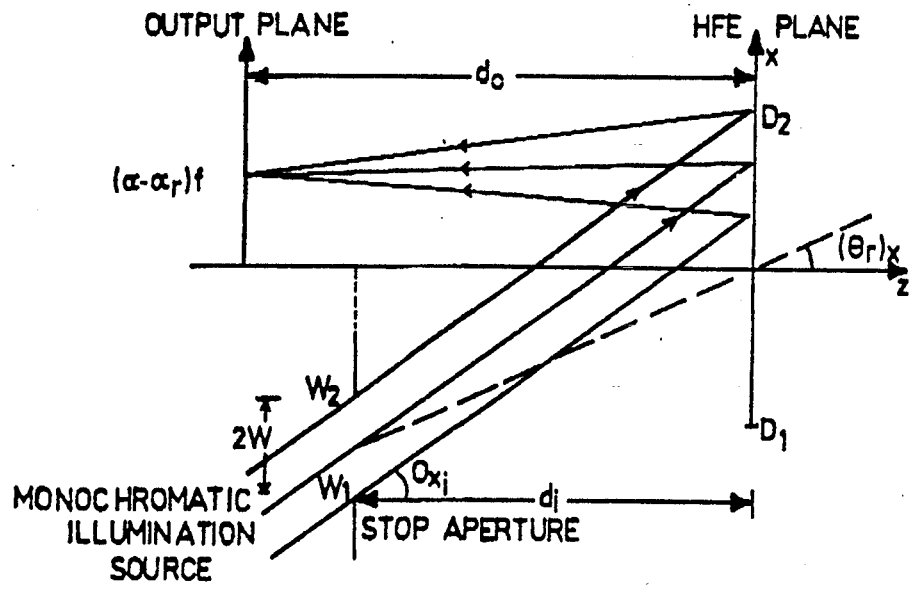
FIGS. 1 and 1a illustrate the readout geometry for a reflective off-axis and on-axis, respectively, holographic focussing element (HFE)

Before describing a preferred embodiment of the invention it will be helpful first to describe the general optimization procedure on which the present invention is based.

THE GENERAL OPTIMIZATION PROCEDURE

A HOE is generally described as a diffractive grating that modifies the phase of an incoming wavefront to another output phase. Accordingly, the phase of the output wavefront, $\phi_o$, for the first diffracted order is given by $$\phi_o \phi_i - \phi_h, \tag{1}$$

where $\phi_i$ is the phase of the input wavefront and $\phi_h$ is the grating function of the HOE. We found that it is advantageous to exploit the normalized propagation vectors and grating vector of the holographic element, rather than the phases.

The normalized propagation vectors, which can be regarded as the direction cosines of the input ($\hat{K}_i$) and output ($\hat{K}_o$) rays, can be written as $$\hat{K}_o = \frac{\lambda}{2\pi} \overline{\nabla}\phi_o, \quad \hat{K}_i = \frac{\lambda}{2\pi} \overline{\nabla}\phi_i, \tag{2}$$

and the grating vector $\overline{K}_h$, as $$\overline{K}_h = \frac{\lambda}{2\pi} \overline{\nabla}\phi_h = \frac{\lambda}{\Lambda_x}\hat{x} + \frac{\lambda}{\Lambda_y}\hat{y}, \tag{3}$$

where $\overline{\nabla}$ is the gradient operator, $\Lambda_x$ and $\Lambda_y$ are the grating spacing in x and y directions, and $\lambda$ is the readout wavelength. The diffraction relations can now be written as $$\hat{K}_{xo} = \hat{K}_{xi} - K_{xh}, \tag{4}$$

$$\hat{K}_{yo} = \hat{K}_{yi} - K_{yh}, \tag{5}$$

$$\hat{K}_{zo} = \pm\sqrt{1 - \hat{K}_{xo}^2 - \hat{K}_{yo}^2}. \tag{6}$$

Note that $\hat{K}_{xo}^2 + \hat{K}_{yo}^2$ would be less than one so as not to obtain evanescent wavefronts.

The goal when designing HOEs is to transfer input rays into corresponding output rays that will be optimized for a given range of input parameters. The input parameter could, for example, be the direction cosine of the incoming waves, or the location of the input point sources. For a single specific input parameter it is relatively easy to form a HOE that will yield the exact desired output rays. However, for a range of input parameters, it it necessary to optimize the grating vector so as to minimize the difference between the actual and the desired output rays. The optimization is achieved by minimizing the mean-squared difference between these two sets of rays.

We shall describe the method in a two dimensional notation. The mean-squared difference of the propagation vector components of the actual and desired output rays includes two scalar equations, and is written as $$E_\perp^2 = \int\int\int\int [\hat{K}_{\perp d}(x,y,a,b) - \hat{K}_{\perp o}(x,y,a,b)]^2 da db dx dy, \tag{7}$$

where $\perp$ denotes the transverse vector components $\hat{x}$ and $\hat{y}$, $\hat{K}_{\perp d}(x,y,a,b)$ and $\hat{K}_{\perp o}(x,y,a,b)$ are the direction cosines of the desired and actual output rays, x and y are the space coordinates on the HOE, a and b are the input parameters for x and y coordinates respectively. Equation (7) can be expanded, by using Eqs. (4) and (5), to $$E_\perp^2 = \int\int\int\int [\hat{K}_{\perp d}(x,y,a,b) - \hat{K}_{\perp i}(x,y,a,b) + K_{\perp h}(x,y)]^2 da db dx dy. \tag{8}$$

The optimal grating vector components $K_{xh}(x,y)$ and $K_{yh}(x,y)$ can be determined by minimizing $E_x^2$ and $E_y^2$. However, because the integrand is always positive, it is sufficient to minimize a simpler integral, that we denote as $e_\perp^2(x_o,y_o)$, $$e_\perp^2(x_o,y_o) = \int\int [\hat{K}_{\perp d}(x_o,y_o,a,b) - \hat{K}_{\perp i}(x_o,y_o,a,b) + K_{\perp h}(x_o,y_o)]^2 da db, \tag{9}$$

where $x_o$ and $y_o$ represent arbitrary coordinates of x and y. Differentiating $e_\perp^2(x_o,y_o)$ with respect to $K_{\perp h}(x_o,y_o)$, setting the result to zero, and noting that the second derivative of $e_\perp^2$ is always positive, yields the optimal grating vector components, $$K_{\perp h}(x,y) = \frac{-\int\int [\hat{K}_{\perp d}(x,y,a,b) - \hat{K}_{\perp i}(x,y,a,b)] da db}{\int\int da db}. \tag{10}$$

We would like to note that, in general, the optimization procedure can include the effects of different optimization weighting for each input parameter, and readout with broad spectral illumination. In such a case Eq. (10) would be generalized to $$K_{\perp h}(x,y) = \frac{-\{\int\int\int W_\mu(\mu)W(a)W(b)\mu[\hat{K}_{\perp d}(x,y,a,b,\mu) - \hat{K}_{\perp i}(x,y,a,b,\mu)] da db d\mu\}}{[\int\int\int W_\mu(\mu)W(a)W(b)\mu^2 da db d\mu]}.$$

In this generalized equation W(a) and W(b) are the optimization weighting functions for the input parameters a and b, where $0 \leq W(a) \leq 1$ and $0 \leq W(b) \leq 1$. Also, $W_\mu(\mu)$ denotes the weighing function for the readout wavelengths; where $0 \leq W_\mu(\mu) \leq 1$ and $\mu$ is the ratio of the readout wavelength over the recording wavelength.

The optimal two dimensional grating function $\phi_h(x,y)$ can be found, using Eq. (3), by integrating along some arbitrary path to yield $$\phi_h(x,y) - \phi_h(0,0) = \frac{2\pi}{\lambda} \int_c \overline{K}_h \cdot d\overline{r} = \frac{2\pi}{\lambda} \int_o^{(x,y)} K_{xh}(x,y)dx + K_{yh}(x,y)dy, \tag{11}$$

where $\phi_h(0,0)$ can be defined as zero.

For a unique solution, the condition of $\nabla_\perp \times \overline{K}_h = 0$ must be fulfilled, where the gradient $\nabla_\perp$ denotes $$\frac{\partial}{\partial x}\hat{x} + \frac{\partial}{\partial y}\hat{y}.$$

This condition can be written explicitly as $$\frac{\partial K_{xh}(x,y)}{\partial y} = \frac{\partial K_{yh}(x,y)}{\partial x}. \tag{12}$$

Figure 1A:
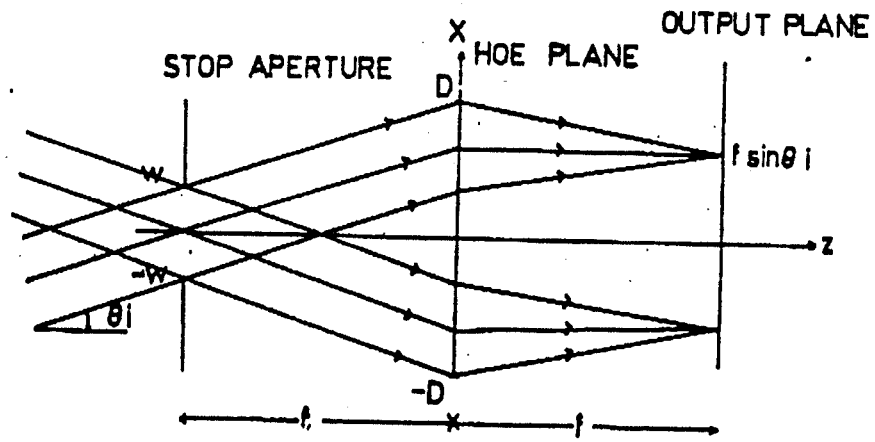

For an on-axis holographic element, having circular symmetry, as illustrated in FIG. 1a this condition is always fulfilled. However, in general, for off-axis elements, this condition is not fulfilled, so that an exact solution for the grating function $\phi_h(x,y)$ cannot be found. Nevertheless, it is possible to obtain approximate solutions. For example, when the off-axis angle is relatively low, it is possible to approximate the grating function by simply adding a linear phase term to the on-axis design.

A more general approximate solution for $\phi_h(x,y)$ can be derived by noting that in many cases $K_{xh}(x,y)$ has weak dependence on y coordinate and $K_{yh}(x,y)$ has weak dependence on x coordinate over the whole holographic element's area; thus, these two-dimensional grating vector components can be approximated by one-dimensional components $[K_{xh}(x)]_{app.}$ and $[K_{yh}(y)]_{app.}$. Here, the approximation is based on minimizing the mean-squared difference of the grating vector components between the optimal two dimensional grating vector components and the approximate one-dimensional grating vector components. The mean-squared difference for $\hat{x}$ component, for example, is defined as $$e_x'^2(x_o) = \int \{[K_{xh}(x_o)]_{app.} - K_{xh}(x_o,y)\}^2 dy, \tag{13}$$

where $K_{xh}(x,y)$ is given by Eq. (10). Differentiating $e_x'^2(x_o)$ with respect to $[K_{xh}(x_o)]_{app.}$ and setting the result to zero, yields the approximate grating vector component $$[K_{xh}(x)]_{app.} = \frac{\int K_{xh}(x,y) dy}{\int dy}. \tag{14}$$

The same approximation procedure for the $\hat{y}$ component yields $$[K_{yh}(y)]_{app.} = \frac{\int K_{yh}(x,y) dx}{\int dx}. \tag{15}$$

Consequently, the two-dimensional grating function $\phi_h(x,y)$, can be approximated by two separated one-dimensional functions using Eq. (3), and Eqs. (14) and (15), to yield $$\phi_h(x,y) \simeq \frac{2\pi}{\lambda} \int [K_{xh}(x)]_{app.} dx + \frac{2\pi}{\lambda} \int [K_{yh}(y)]_{app.} dy. \tag{16}$$

The approximation of Eq. (16) is sufficiently general so as to be valid for higher off-axis angles and lower f number.

DESCRIPTION OF A PREFERRED EMBODIMENT

The operation and parameters of a reflective Holographic Focussing Element (HFE) are described with the aid of the one-dimensional representation in FIG. 1. Here each input plane wave converges at the output plane, to a point whose location corresponds to the angular direction of the input wave. The aperture of the HFE extends from coordinates $D_1$ to $D_2$, whereas the width of the input stop aperture is 2W, and it extends from coordinates $W_2$ to $W_1$. Finally, $d_i$ and $d_o$ are the distances from the holographic element to the input stop aperture and output plane, respectively.

We shall now describe the procedure for designing the HFE. For this design, it is convenient to let the input parameters a and b, be the direction cosines of the input plane waves $$a = \alpha = \sin\theta_{xi}, \tag{17}$$

$$b = \beta = \sin\theta_{yi}, \tag{18}$$

where $\theta_{xi}$ and $\theta_{yi}$ are ninety degrees minus the angles between the incident ray and the x and y axes respectively. Furthermore, to simplify the presentation, we shall only deal with the $\hat{x}$ components of the propagation vectors and of the grating vector.

The normalized propagation vector of the input rays is $$\hat{K}_{xi}(x,y,a,b) = \alpha. \tag{19}$$

Now, an input plane wave, having a direction cosine $\alpha$, must be transformed at a distance $d_o$ into a spherical wave converging to a point $(\alpha - \alpha_r)f$, where $\alpha_r = -\sin(\theta_r)_x$, $(\theta_r)_x$ is the off-axis angle $((\theta_r)_y=0)$, and f is a proportionality constant. Thus, the direction cosines of the desired output rays become $$\hat{K}_{xd}(x,y,a,b) = \frac{-[x - (\alpha f - \alpha_r f)]}{\sqrt{[x - (\alpha f - \alpha_r f)]^2 + (y - \beta f)^2 + d_o^2}}. \tag{20}$$

Substituting $\hat{K}_{xi}$ from Eq. (19) and $\hat{K}_{xd}$ from Eq. (20) into Eq. (10), and using the approximation of Eq. (14), yields $$[K_{xh}(x)]_{app.} = \frac{-\iiint \left\{ \frac{-[x - (\alpha f - \alpha_r f)]}{\sqrt{[x - (\alpha f - \alpha_r f)]^2 + (y - \beta f)^2 + d_o^2}} - \alpha \right\} da d\beta dy}{\iiint da d\beta dy} \tag{21}$$

To solve Eq. (21), the limits of integration must be expressed by the upper $\alpha_2(x,y)$, $\beta_2(x,y)$ and lower $\alpha_1(x,y)$, $\beta_1(x,y)$ direction cosines of the input plane waves that intercept the holographic lens at a point (x,y). It is then possible to solve Eq. (21) directly by numerical methods, but for an analytic solution some approximations are needed. First, the extreme direction cosines $\alpha_1(x,y)$ and $\alpha_2(x,y)$ are approximated as a function of the x coordinate only, $\alpha_1(x)$ and $\alpha_2(x)$; the details of this approximation are given in the Appendix A. Second, the triple integral of Eq. (21) is simplified to only two integrations by combining the variables $\beta$ and y into one variable $\eta_x$ through the relation $\eta_x = (y - \beta f)^2$. According to these approximations, Eq. (21) becomes $$[K_{xh}(x)]_{app.} = \frac{-1}{(\eta_{2x} - \eta_{1x})(\alpha_2(x) - \alpha_1(x))} \int_{\eta_{1x}}^{\eta_{2x}} \int_{\alpha_1(x)}^{\alpha_2(x)} \left\{ \frac{-[x - (\alpha f - \alpha_r f)]}{\sqrt{[x - (\alpha f - \alpha_r f)]^2 + \eta_x + d_o^2}} - \alpha \right\} d\alpha d\eta_x, \quad (22)$$

where $\eta_{2x}$ and $\eta_{1x}$ are the upper and lower values of $\eta_x$. For the HFE geometry shown in FIG. 1, $\eta_{1x}$ is equal to zero and $\eta_{2x}$ depends on x. Since the dependence on x is not strong, it is possible to let $\eta_{2x}$ be a free constant parameter that can be exploited for optimizing the optical performance of the holographic element. Such a free constant parameter could partially compensate for the earlier approximations.

The solution of Eq. (22) provides the final holographic grating vector component as $$[K_{xh}(x)]^*_{app.} = \frac{\alpha_2(x) + \alpha_1(x)}{2} - \frac{2}{3f(\alpha_2(x) - \alpha_1(x))(\eta_{2x} - \eta_{1x})} \times \quad (23)$$

$$\{[x + \alpha_r f - \alpha_2(x)f)^2 + d_o^2 + \eta_{2x}]^{3/2} -$$

$$[(x + \alpha_r f - \alpha_2(x)f)^2 + d_o^2 + \eta_{1x}]^{3/2} -$$

$$[(x + \alpha_r f - \alpha_1(x)f)^2 + d_o^2 + \eta_{2x}]^{3/2} +$$

$$[(x + \alpha_r f - \alpha_1(x)f)^2 + d_o^2 + \eta_{1x}]^{3/2}\}.$$

An identical procedure for determining the $\hat{y}$ component of the grating vector $[K_{yh}(y)]_{app.}*$ was used, and with Eq. (16), the two-dimensional grating function for the HFE, was found.

To evaluate the performance of the optimally designed HFE, we performed a ray-tracing analysis,[19] using Eqs. (4)–(6); the parameters of the element were chosen as f = 60 mm, $d_o$ = 60 mm W = 10 mm, $(\theta_r)_x$ = 25°, $(\theta_r)_y$ = 0°, the ranges of angles $\theta_{xi}$ and $\theta_{yi}$ were 20° < $\theta_{x-i}$ < 30° and −5° < $\theta_{yi}$ < 5° so $\Delta\theta_{xi} = \Delta\theta_{yi}$ = 10°. We found that the focussed spots are sufficiently small when $d_i$ = 55 mm, $\eta_{2x}$ = 23 mm², $\eta_{2y}$ = 90 mm², and $\eta_{1x} = \eta_{1y}$ = 0 mm². Note that these parameters were so chosen as to enable separation between the reflected zero orders and the diffracted first orders and to prevent the input stop aperture from blocking the reflected diffraction orders. We also performed a ray-tracing analysis for a quadratic grating function, given by $$[\phi_h(x,y)]_q = \frac{2\pi}{\lambda} \left[ \left( \frac{x^2 + y^2}{2f} \right) + \alpha_r x \right], \quad (24)$$

as well as for a spherical grating function, given by $$[\phi_h(x,y)]_{sph} = \frac{2\pi}{\lambda} [(x^2 + y^2 + f^2)^{1/2} + \alpha_r x]. \quad (25)$$

The geometrical parameters for the quadratic HFE and for the spherical HFE were the same as above, except that for these elements $d_i$ was chosen so as to optimize the focussed spot sizes; i.e., $d_i$ = 46 mm for the quadratic HFE and $d_i$ = 39 mm for the spherical HFE.

Figure 2A:
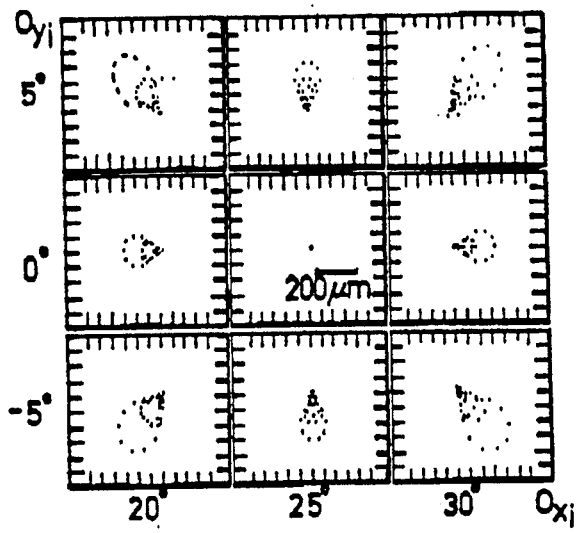
FIGS. 2a, 2b and 2c are spot diagrams for the off-axis HFE, FIG. 2a illustrating the spherical grating function, FIG. 2b illustrating the quadratic grating function, and FIG. 2c illustrating the optimized grating function.
Figure 2B:
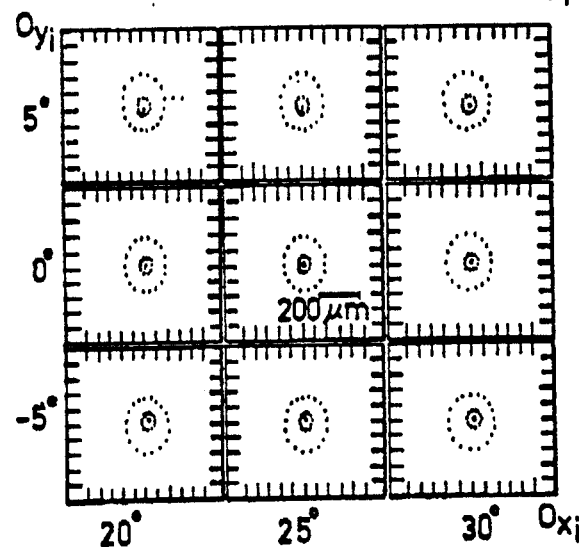
Figure 2C:
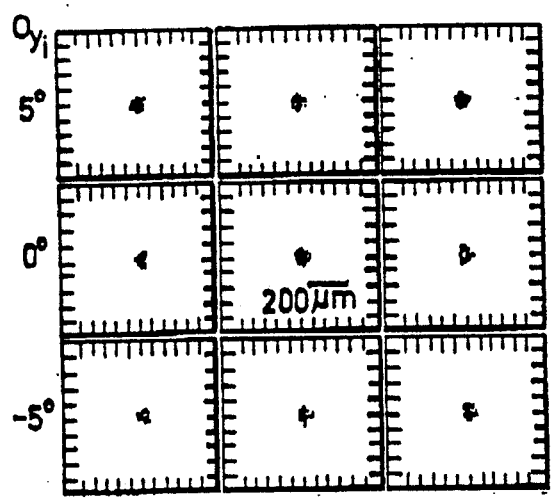

The results of the ray tracing analysis for the three focussing elements, which do not take into account the diffraction from the aperture, are shown in FIG. 2. They show the spot diagrams for the three lenses as a function of nine discrete input angles of $[\theta_{xi}, \theta_{yi}]$. As shown in FIG. 2(a), the small central spot diagram for the spherical lens is essentially ideal because the recording and readout geometries are identical. However, as the readout input angles differ from the recording angles, the spot diagrams spread substantially. For the quadratic lens, shown in FIG. 2(b), the spread in the spot diagrams is comparable to that of the spherical lens. Finally, as shown in FIG. 2(c), it is evident that the lens designed according to our optimized procedure is uniformly superior to the other lenses, with relatively small spot diagrams, over the entire range of input angles. These results demonstrate that the spot sizes for the optimized lens, are uniformly lower than the diffraction limited size, whereas for the spherical and the quadratic lenses the spot sizes are much larger than the diffraction limit $$\left( D \cdot L = 2.44\lambda \frac{f}{2W} \approx 80 \ \mu m \right).$$

EXPERIMENTAL REALIZATION AND RESULTS

In order to realize the holographic focussing element, the optimized grating function was first plotted as a Lee-type binary computer generated hologram (CGH) having the same parameters as those described in the preceding section. The amplitude transmittance of the CGH is given by $$t_a = U_s[\cos(\phi_h(x,y))]. \quad (26)$$

The term $U_s$ is a unit step function defined by $$U_s(\xi) = \begin{cases} 1 & \text{when } \xi \geq 0 \\ 0 & \text{when } \xi < 0 \end{cases} \quad (27)$$

The binary CGH was plotted with a laser scanner [Scitex Raystar, Response 300], having resolution capabilities of about 10 $\mu$m, and recorded directly onto photographic film. The recorded plot was then demagnified optically (six times) and recorded as a chrome master mask. The information from the mask was transferred by contact printing and suitable exposure onto a glass substrate coated with aluminum and photoresist. After developing the photoresist, the aluminum was etched and the remaining photoresist was removed. Finally, in order to obtain a high reflective final element, a thin gold layer was vacuum deposited on the etched aluminum layer.

Figure 3A:
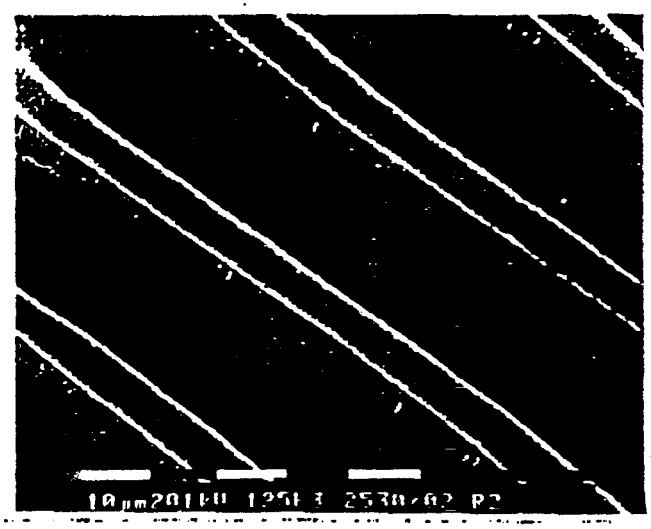
FIGS. 3a and 3b illustrate typical etched sections of a modulated surface of the HFE, each white line extending over 10 $\mu m$ in FIG. 3a, and over 100 $\mu m$ in FIG. 3b.
Figure 3B:
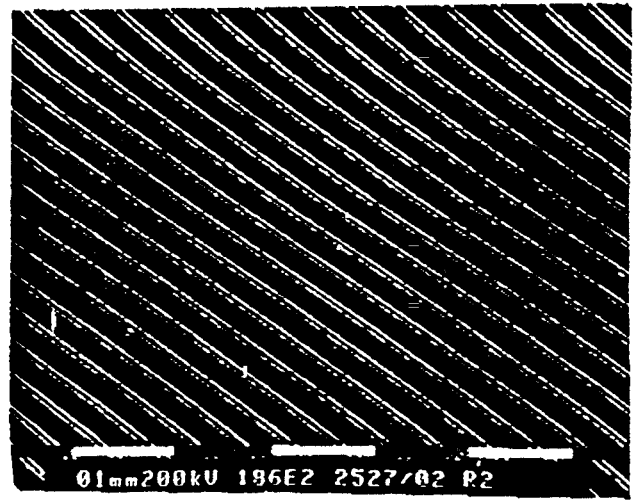

FIG. 3 shows two electron microscope pictures of a typical etched section of the modulated surface of the element, each with a different magnification. As a result of the recording and processing, we end up with a reflective HOE having a relief pattern. In the scalar approximation, an incident wavefront is multiplied by the reflectance H(x,y) of the HOE that is described by $$H(x,y) \simeq \exp\left[i\left(\frac{4\pi d}{\lambda} t_a(x,y)\right)\right], \qquad (28)$$

where $t_a$ is given by Eq. (26) and d is the depth of the surface modulation. The relevant first diffracted order is then proportional to the desired $e^{i\phi h(x,y)}$; by setting $$d \simeq \frac{\lambda}{4},$$

it is possible to maximize the diffraction efficiency.

Figure 4:
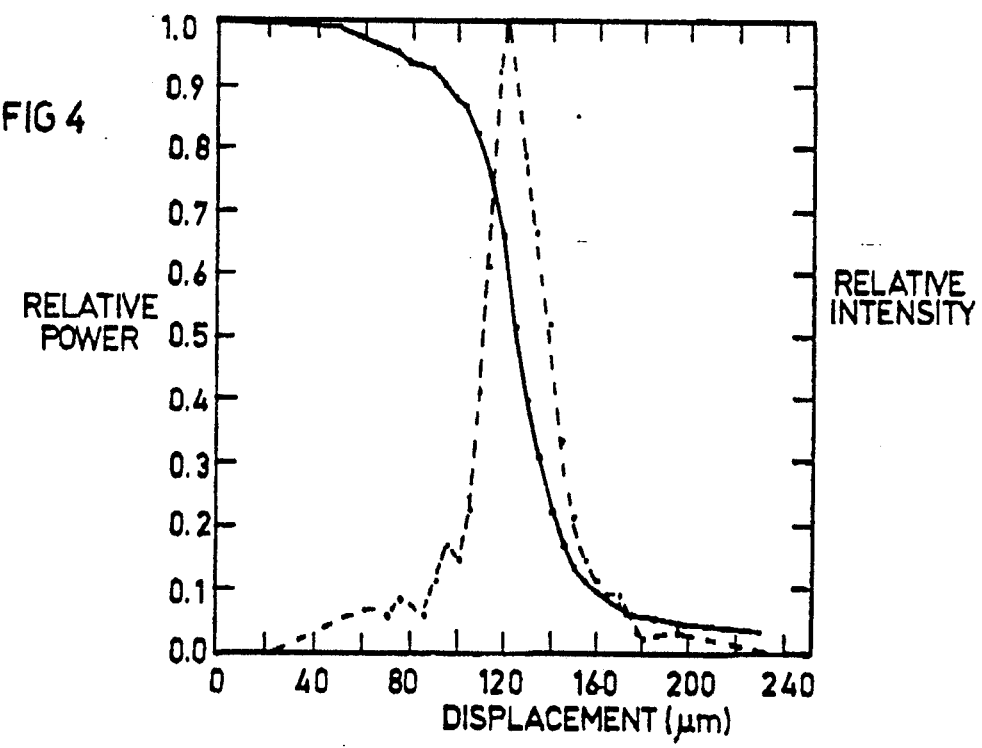
FIG. 4 illustrates the relative power of the light as a function of the displacement of the knife edge at the focussing plane for one input plane wave at $\theta_{xi}=30°$, $\theta_{yi}=0°$ shown by the solid curve, the corresponding intensity distribution of the focussed spot being shown by the dashed curved.

The focussing element was tested with a $CO_2$ laser at a wavelength of 10.6 μm. The focussed spot sizes were measured for various input plane waves by using the scanning knife-edge method. Two stepper motors were used; one for moving the knife-edge and the other for changing the distance, $d_{out}$, from the holographic element to the measurement plane. FIG. 4 shows a representative result for the relative power and relative intensity at the focussing plane, as a function of the displacement of the knife edge for an input plane wave at $\theta_{xi}=30°$, $\theta_{yi}=0°$. The relative power is depicted by the solid curve. Initially the knife edge does not block any of the focussing light so the total power is high, but as it scans across the focussed spot, it blocks more of the light. The intensity distribution at the measurement plane was found by taking the derivative of the solid curve, and the result is shown by the dashed curve. The spot sizes were determined directly by multiplying the standard deviation of the distribution by four. The measurements were performed for the entire range of input angles, $20° < \theta_{xi} < 30°$, $-5° < \theta_{yi} < 5°$ and we found that the spot sizes were uniformly equal to the diffraction limit, $D_{D.L} \simeq 80$ μm [f=60 mm, W=10 mm].

Figure 5:
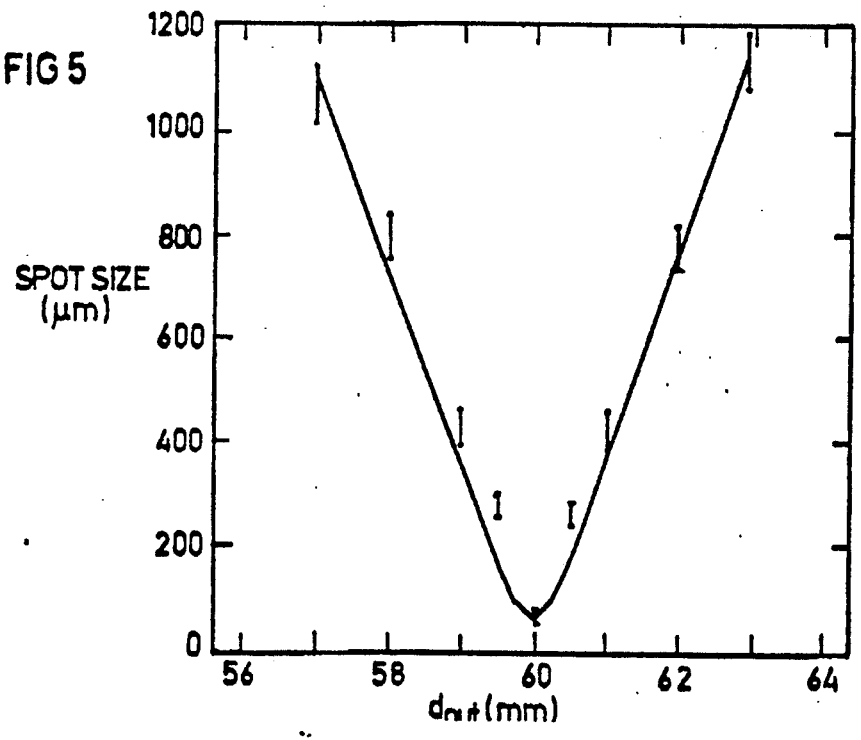
FIG. 5 illustrates the spot size as a function of the distance ($d_{out}$) between the hologram and the measurement plane, for an input plane wave at $\theta_{xi}=25°$, $\theta_{yi}=0°$, the experimental data being depicted by the error bars, and the solid curve representing the calculated results.

FIG. 5 shows the spot size as a function of the distance $d_{out}$ between the hologram and the measurement plane for one input plane wave at $\theta_{xi}=25°$, $\theta_{yi}=0°$; the experimental data is given by the error bars. Also shown (the solid curve) are the spot sizes calculated according to the Fresnel diffraction integral. For these calculations, we neglected the geometric aberrations of the focussing element. The diffraction limited spot size of 80 μm is obtained when $d_{out}$ is 60 mm. As evident, the calculated and experimental results are in good agreement.

In the realization procedure, there are several factors that can deteriorate the spot sizes of the holographic element; the quantization of the grating function by the laser scanner, the aberrations of the optical demagnification system, and the photolithographic process. Note that for the focussing element described above, the thinnest line of the grating function, contains only four demagnified pixels of the laser scanner. Nevertheless, these factors did not significantly degrade the performance of our element, as we realized a diffraction-limited performance for the entire range of input angles.

SUMMARY

We have shown that it is possible to design and realize aspheric low f number reflective off-axis focussing elements, for far IR radiation, having a diffraction-limited performance over a broad range of incidence angles. The design method is based on analytic ray tracing and exploits the propagation vectors of the waves, so as to allow the realization of optimized HOEs. Results of the ray tracing analysis reveal that lenses designed according to our design method perform significantly better than spherical and quadratic holographic lenses. The necessary aspheric grating functions were realized by using a laser scanner and photolithographic techniques to form a CGH. These CGH elements were tested in the laboratory, and the experimental results are in good agreement with our ray-tracing analysis; specifically, diffraction-limited spot sizes were obtained over a relatively large range of input angles.

APPENDIX A

The Expression for the Extreme Direction Cosines $\alpha_1(x)$ and $\alpha_2(x)$ The expressions for the lower $[\alpha_1(x)]$ and the upper $[\alpha_2(x)]$ direction cosines, that represent the pupil function, depend on readout geometry, which in our case is shown in FIG. 1.

The lower $[\alpha_1(x)]$ direction cosine is $$\alpha_1(x) = \frac{(x - W_2)}{\sqrt{(x - W_2)^2 + (\Delta y)^2 + d_i^2}}, \qquad (1A)$$

when $$\alpha_1(x) > \alpha_{min},$$

otherwise $$\alpha_1(x) = \alpha_{min}. \qquad (2A)$$

In Eq. (1A), $\Delta y$ is defined by $\Delta y \equiv y_{stop} - y$, where $y_{stop}$ represents the input stop aperture coordinate, and y the coordinate at the hologram plane. For a one-dimensional grating function $\Delta y = 0$, whereas for a two-dimensional grating function (approximated by two separated one-dimensional grating functions), $\Delta y$ is chosen to yield minimum $\alpha_1(x)$. The direction cosine $\alpha_{min}$ is for the plane wave having the lowest angular direction while still completely intercepting the hologram.

The upper $[\alpha_2(x)]$ direction cosine is $$\alpha_2(x) = \frac{(x - W_1)}{\sqrt{(x - W_1)^2 + (\Delta y)^2 + d_i^2}}, \qquad (3A)$$

when $$\alpha_2(x) < \alpha_{max},$$

otherwise $$\alpha_2(x) = \alpha_{max}. \qquad (4A)$$

For a one-dimensional grating function $\Delta y = 0$, whereas for a two-dimensional grating function $\Delta y$ is chosen to yield maximum $\alpha_2(x)$. The direction cosine $\alpha_{max}$ is for the plane wave having the highest angular direction while still completely intercepting the hologram.

What is claimed is:

1. A method of designing a holographic diffractive grating that transforms a set of incident waves into a set of output waves in order to produce output waves having minimum aberrations, comprising the steps:
   (a) defining continuous input parameters that characterize the set of incident waves and a set of desired output waves with propagation vector components;

(b) formulating integral equations for optimal grating vector components of the holographic diffractive grating to be designed; and (c) solving said integral equations for the optimal grating vector components to minimize the difference between the propagation vector components of a set of waves actually emerging from the holographic diffractive grating and the set of desired output waves.

2. The method according to claim 1, wherein said integral equations are solved analytically.

3. The method according to claim 1, wherein said integral equations are solved numerically.

4. The method according to claim 1, wherein the input parameters include the direction cosines of the set of incident waves.

5. The method according to claim 1, wherein the input parameters include locations of input point sources.

6. The method according to claim 1, wherein the set of incident waves is from a monochromatic illumination source.

7. The method according to claim 6, wherein the monochromatic illumination source is a laser.

8. The method according to claim 7, wherein said laser outputs radiation of 10.6 microns.

9. The method according to claim 1, wherein the set of incident waves is from a quasi-monochromatic illumination source.

10. The method according to claim 1, wherein the holographic diffractive grating is an on-axis holographic element having circular symmetry.

11. The method according to claim 1, wherein the holographic diffractive grating is an off-axis holographic diffractive grating, the optimal grating vector components being obtained by certain approximations including one approximation based on minimizing the mean squared difference of the grating vector components between the optimal two-dimensional grating vector components and the approximate one-dimensional grating vector components.

12. The method according to claim 1, wherein a mask is generated by a computer according to the above steps and is first plotted with a laser scanner, then reduced in size with optical demagnification, and finally recorded as a relief pattern by using a photolithographic technique.

* * * * *